United States Patent
Shin et al.

(10) Patent No.: US 9,223,121 B2
(45) Date of Patent: Dec. 29, 2015

(54) OPTICAL STRUCTURE FOR ACQUIRING FINGERPRINT IMAGE

(75) Inventors: Dong Mok Shin, Seongnam-si (KR); Jae Hyeon Park, Seongnam-si (KR); Jae Won Lee, Seongnam-si (KR)

(73) Assignee: Suprema Inc., Seongnam-si (KR)

( * ) Notice: Subject to any disclaimer, the term of this patent is extended or adjusted under 35 U.S.C. 154(b) by 351 days.

(21) Appl. No.: 13/198,013

(22) Filed: Aug. 4, 2011

(65) Prior Publication Data

US 2012/0147168 A1    Jun. 14, 2012

(30) Foreign Application Priority Data

Dec. 10, 2010  (KR) .................. 10-2010-0126479

(51) Int. Cl.
*H04N 7/18* (2006.01)
*G02B 17/08* (2006.01)
*G02B 5/04* (2006.01)
*G06K 9/00* (2006.01)

(52) U.S. Cl.
CPC *G02B 17/08* (2013.01); *G02B 5/04* (2013.01); *G06K 9/00046* (2013.01)

(58) Field of Classification Search
CPC ....... G02B 17/08; G02B 5/04; G06K 9/00046
USPC .......... 348/77, E7.085; 382/124, 127; 396/15
See application file for complete search history.

(56) References Cited

U.S. PATENT DOCUMENTS

| 4,805,998 | A  | * | 2/1989  | Chen et al. .................... 359/670 |
|---|---|---|---|---|
| 5,548,394 | A  | * | 8/1996  | Giles et al. ...................... 356/71 |
| 5,732,148 | A  |   | 3/1998  | Keagy et al. |
| 6,505,193 | B1 | * | 1/2003  | Musgrave et al. ..................... 1/1 |
| 6,980,286 | B1 | * | 12/2005 | Feng ................................ 356/71 |
| 7,426,020 | B2 | * | 9/2008  | Plummer et al. ................ 356/71 |
| 2003/0071976 | A1 | * | 4/2003  | Okuyama et al. ............... 353/31 |
| 2005/0265586 | A1 | * | 12/2005 | Rowe et al. .................... 382/124 |
| 2006/0104492 | A1 | * | 5/2006  | Maase et al. .................... 382/124 |
| 2006/0126032 | A1 | * | 6/2006  | Takaura et al. ................. 353/99 |
| 2008/0298650 | A1 | * | 12/2008 | Jang et al. ..................... 382/127 |

FOREIGN PATENT DOCUMENTS

JP        09-179969      7/1997
KR   10-2006-0112808    11/2006

* cited by examiner

*Primary Examiner* — Mohammed Rahaman
(74) *Attorney, Agent, or Firm* — NSIP Law

(57) ABSTRACT

An optical structure for acquiring a fingerprint image with high resolution and minimum distortion is provided. The optical structure includes a prism configured to comprise an input surface to which light is irradiated, a contact surface formed horizontally to be in contact with a finger, and an output surface through which the light that has been irradiated to the input surface and reflected from the finger in contact with the contact surface passes; a lighting unit configured to emit a beam to the input surface of the prism; a reflector unit configured to reflect a fingerprint image passing through the output surface of the prism; a lens unit configured to comprise two or more lenses, each being configured to receive the fingerprint image reflected from the reflector unit; and an image sensor on which the fingerprint image passing through the lens unit is formed.

8 Claims, 4 Drawing Sheets

OPTICAL STRUCTURE FOR ACQUIRING FINGERPRINT IMAGE

CROSS-REFERENCE TO RELATED APPLICATION(S)

This application claims the benefit under 35 U.S.C. §119(a) of Korean Patent Application No. 10-2010-0126479, filed on Dec. 10, 2010, in the Korean Intellectual Property Office, the entire disclosure of which is incorporated herein by reference for all purposes.

BACKGROUND

1. Field

The following description relates to an optical structure for fingerprint acquisition, and more particularly, to an optical structure for acquiring a fingerprint with high-resolution and minimum distortion.

2. Description of the Related Art

Generally, user authentication by fingerprint recognition has been widely used due to the convenience of use, and superior security and economic efficiency. The conventional optical fingerprint acquisition device uses a prism to obtain a fingerprint. That is, in an optical fingerprint optical system including a total internal reflection prism, a resultant image captured by a lens may include keystone distortion due to the inherent optical properties of the optical system if the optical system employs no specific distortion correction technique.

Hence, various methods for acquiring an image with less distortion by correcting for the optical distortion have been introduced.

As the conventional distortion correction methods, an image sensor may be tilted, an optical unit for optical distortion correction may be added between a prism and an image sensor, or software may be used for distortion correction.

However, the method of tilting the image sensor cannot perform precise distortion correction, and the method of addition of the optical correction unit may cost too much, whereas the use of cheap optical element may result in degradation of optical performance (MTF, etc). Moreover, the use of software for distortion correction may take a substantial amount of time to produce an image having its distortion corrected due to the complexity of calculation.

SUMMARY

The following description relates to an optical structure for fingerprint acquisition, which comprises an optical system having minimum distortion within a scope that does not deteriorate optical performance and ultimately adjusts magnification of an image using a simple software processing algorithm.

In one general aspect, there is provided an optical structure for fingerprint acquisition, including: a prism configured to comprise an input surface to which light is irradiated, a contact surface formed horizontally to be in contact with a finger, and an output surface through which the light that has been irradiated to the input surface and reflected from the finger in contact with the contact surface passes; a lighting unit configured to emit a beam to the input surface of the prism; a reflector unit configured to reflect a fingerprint image passing through the output surface of the prism; a lens unit configured to comprise two or more lenses, each being configured to receive the fingerprint image reflected from the reflector unit; and an image sensor on which the fingerprint image passing through the lens unit is formed.

Other features and aspects may be apparent from the following detailed description, the drawings, and the claims.

Figure 1:
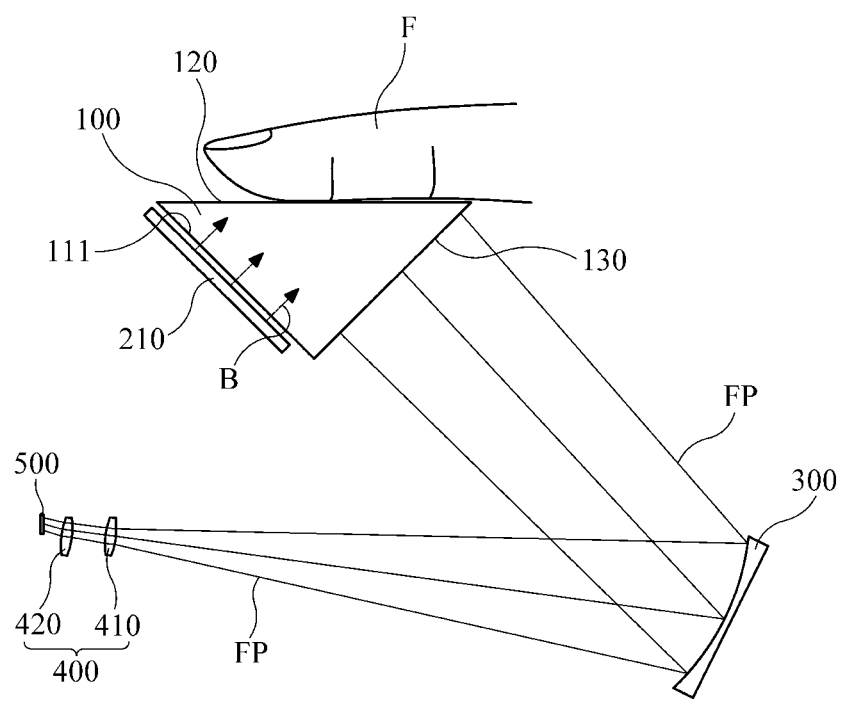
FIG. 1 is a diagram illustrating an example of an optical structure for fingerprint acquisition.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 2:
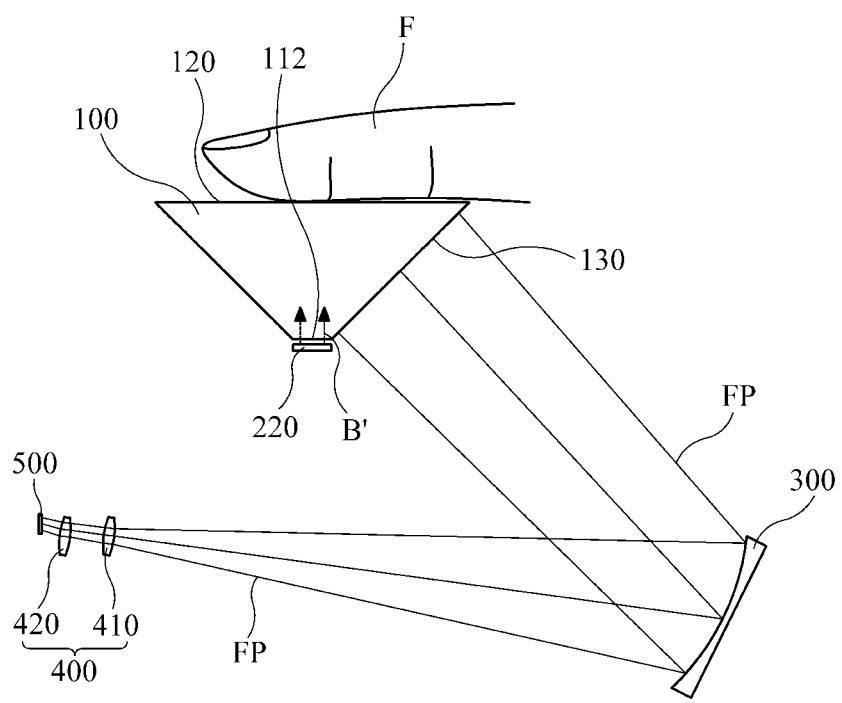
FIG. 2 is a diagram illustrating another example of the optical structure for fingerprint acquisition.
Figure 3:
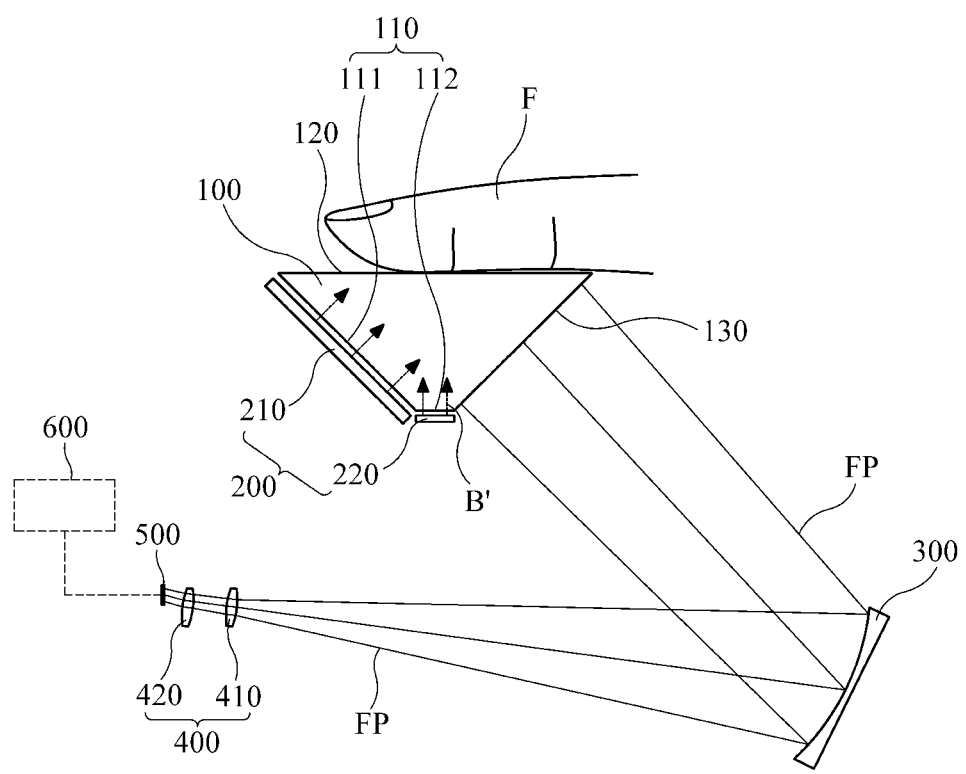
FIG. 3 is a diagram illustrating another example of the optical structure for fingerprint acquisition.
Figure 4:
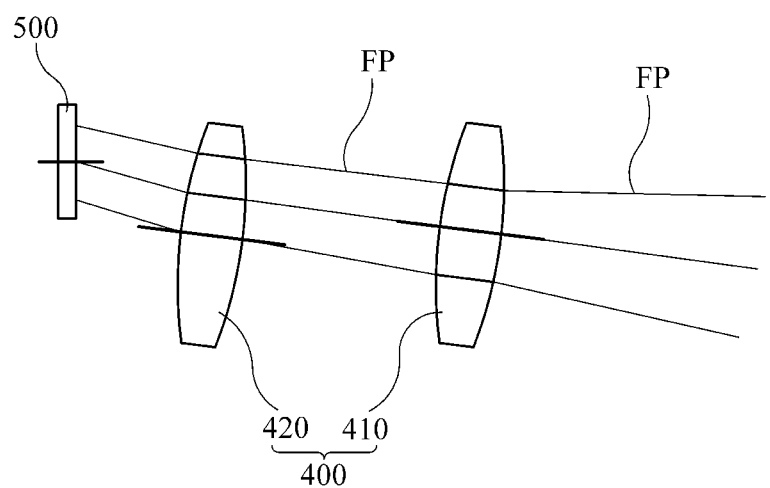
FIG. 4 is a partially enlarged diagram illustrating the optical structure for fingerprint acquisition.

FIG. 1 illustrates a diagram of an example of an optical structure for fingerprint acquisition. FIG. 2 illustrates a diagram of another example of the optical structure for fingerprint acquisition. FIG. 3 illustrates a diagram of another example of the optical structure for fingerprint acquisition. FIG. 4 illustrates a partially enlarged diagram of the optical structure for fingerprint acquisition.

As shown in FIGS. 1 to 3, the optical structure for fingerprint acquisition may include a prism 100, a lighting unit 200, a reflector unit 300, a lens unit 400, and an image sensor 500.

The prism 100 may include an input surface 110 to which a beam B is irradiated, a contact surface 120 that is formed horizontally to be in contact with a finger F, and an output surface 130 through which the beam B that have been irradiated to the input surface 110 and reflected from the finger F passes.

The lighting unit 200 may emit a beam B to the input surface 110 of the prism 100, and may be disposed to emit light toward the input surface 110 among optical surfaces of the prism 100. Accordingly, the light irradiated from the lighting unit 200 may be reflected from the contact surface 120, that is, the fingerprint of the finger in contact with the contact surface 120, pass through the output surface 130, and then travel to the reflector unit 300.

The lighting unit 200 may be implemented by a variety of lighting means, and be formed by arranging a plurality of light emitting diodes (LEDs). For example, the lighting unit 200 may be formed as line beam or surface lighting that emits light fully to the input surface 110. The reflector unit 300 may reflect a fingerprint image FP that is reflected through the output surface 130 of the prism 100.

In one example, the reflector unit 300 may be a concave mirror that reflects and focuses the fingerprint image FP to the lens unit 400.

The reflector unit 300 may change a path of the fingerprint FP, and if it is implemented as an optical concave mirror, may correct for geometric distortion of the fingerprint image FP.

The reflector unit 300 formed as an optical concave mirror between the prism 100 and the lens unit 400 preliminarily corrects for large keystone distortion, and the distortion is more precisely corrected by lenses 410 and 420 which are disposed with their respective principal axes eccentric to each other and by tilting the image sensor 500.

The lens unit 400 may include two or more lenses 410 and 420, each of which receives the fingerprint image FP reflected from the reflector unit 300.

The lens unit 400 may form an optical image from the fingerprint image FP reflected from the reflector unit 300. On the other hand, the lens unit 400 may be disposed to directly receive the light from the output surface 130 of the prism 100 without passing through the reflector unit 300.

The fingerprint image FP passing through the lens unit 400 may be formed on the image sensor 500.

The image sensor 500 may convert the optical image formed thereon into an electrical signal and perform image processing. The image sensor 500 may be electrically connected to an image processing unit. The image sensor 500 may convert the optical image into an electrical signal, and may be formed of an image sensor such as a charge coupled device (CCD), a complementary metal oxide semi-conductor (CMOS), or the like.

The image processing unit may perform image processing on the electrical signal converted by the image sensor 500. The acquired fingerprint image may be compared to a registered fingerprint image using a fingerprint recognition algorithm.

While the optical structure shown in the examples illustrated in FIGS. 1 to 3 includes the prism 100, the lighting unit 200, the lens unit 400, and the image sensor 500, the optical structure may further include an optical band-pass filter (BPF) or may reduce the overall size of an optical system by changing an optical path using an optical mirror, thereby minimizing the product size.

Moreover, to obtain a high-resolution and low distortion image, more lenses are provided, or an aspheric lens is used to reduce optical distortion factors.

In the example, the lens units 400 may include a first lens 410 and a second lens 420.

The first lens 410 is disposed forward of the second lens 420 to receive the fingerprint image FP reflected from the reflector unit 300, and the second lens 420 having a principal axis eccentric with respect to the principal axis of the first lens 410 is disposed behind the first lens 410 to receive the fingerprint image FP that has passed through the first lens 410.

For example, the fingerprint image FP reflected from the reflector unit 300 may be uniformly irradiated to an upper portion and a lower portion of the first lens 410 with respect to the principal axis, and may pass through the upper and lower portions.

The first lens 410 and the second lens 420 may be aligned to each other in such a manner that one end of the fingerprint image FP from the first lens 410 passes through the principal axis of the second lens 420.

Ultimately, the fingerprint image FP that has passed through the second lens 420 may be formed on the image sensor 500.

In another example, the optical structure for fingerprint acquisition may further include an image adjusting unit 600.

The image adjusting unit 600 may adjust the fingerprint image FP formed on the image sensor 500 to have the same aspect ratio or size as the contact surface 120 to which the fingerprint is received.

For example, when it is assumed that an initial fingerprint image acquired from the contact surface 120 of the prism 100 is perfect square, a shape of a fingerprint image that has passed through the prism 100 and the lens unit 400 and is finally formed on the image sensor 500 is not perfect square nor trapezoid that is formed on a conventional optical structure, but a rectangle with longer a width (or a height).

Thus, the finally obtained image does not change in an optical ratio with respect to a vertical axis (or a horizontal axis), but has a higher magnification than a target magnification with respect to a horizontal axis (or a vertical axis). Hence, the image is required to be adjusted to have the same aspect ratio with respect to the vertical axis or the horizontal axis.

For example, a fingerprint acquisition apparatus that acquires a fingerprint image at a resolution of 500 DPI may obtain a fingerprint image with a resolution of 500 DPI in a vertical direction and a resolution of more than 500 DPI in a horizontal direction.

Because the obtained image is a rectangular shape with a longer width than a height, a horizontal magnification may be adjusted at high speed using the image adjusting unit 600 such as a simple software algorithm.

In contrast, according to the arrangement of the reflector unit 300 and the lens unit 400, the fingerprint acquisition apparatus may acquire an image with a resolution of 500 DPI in a horizontal direction and a resolution of more than 500 DPI in a vertical direction.

In this case, because the acquired image is a rectangular shape with a longer height than a width, the vertical magnification of the image may be adjusted at high speed using the image adjusting unit 600 such as a simple software algorithm, and hence it is possible to process fingerprint images in real time without any image distortion when rolled fingerprints or consecutive fingerprints are captured by the fingerprint acquisition apparatus.

In another example, the input surface 110 of the prism 100 may adjoin the contact surface 120, and may include a first input surface 111 formed to be tilted downward from the contact surface 120. The lighting unit 200 may include a first lighting unit 210 that emits a beam B to the first input surface 111.

Since the first input surface 111 of the input surface 110 and the first lighting unit 210 of the lighting unit 200 have the same structure as each other, the beam B emitted from the first lighting unit 210 is totally reflected within the prism 100, and thus the apparatus may be able to be applied to an absorption-type fingerprint acquisition optical system.

In the example, the input surface 110 of the prism 100 may further include a second input surface 112 facing in parallel to the contact surface 120. The lighting unit 200 may further include a second lighting unit 220 that emits a beam B' to the second input surface 112.

Since the second input surface 112 of the input surface 110 and the second light unit 220 of the lighting unit 200 have the same structure as each other, the beam B' emitted from the second lighting unit 220 is not totally reflected, and thus the apparatus may be able to be applied to a scatter-type fingerprint acquisition optical system.

To maintain performances of the optical structure as described above, a distance and arrangement between the prism 100 and the reflector unit 300 are essential factors, and the arrangement of the respective principal axes of the lenses 110 and 120 disposed on a front end of the image sensor 500 is also significantly important. To achieve performance at a given level, the prism 100, the reflector unit 300, and the lens unit 400 are required to be more carefully arranged.

As described above, an optical system is configured to have minimum distortion within a scope that does not deteriorate optical performance, and ultimately magnification of an image is adjusted by the image adjusting unit 600, so that a more clear and accurate fingerprint image can be acquired. In addition, the reflector unit 300 enables a path of light output from the prism 100 to be refracted, thereby reducing the overall size of the optical system and thus minimizing the size of a product.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical structure for fingerprint acquisition, comprising:
    a prism configured to comprise an input surface to which light is irradiated, a contact surface formed horizontally to be in contact with a finger that reflects the light that has been irradiated to the input surface, and an output surface through which the light that has been irradiated to the input surface and reflected from the finger in contact with the contact surface passes;
    a lighting unit configured to irradiate a beam of light to the input surface of the prism;
    a reflector unit configured to reflect a fingerprint image passing through the output surface of the prism;
    a lens unit configured to comprise two or more lenses, each being configured to receive the fingerprint image reflected from the reflector unit,
    wherein the lens unit comprises a first lens configured to receive the fingerprint image reflected from the reflector unit and a second lens configured to receive the fingerprint image from the first lens; the first lens and the second lens are aligned to each other in such a manner that the principal axis of the second lens is eccentric with respect to the principal axis of the first lens such that a light ray of the fingerprint image corresponding to a point of the fingerprint image that passes through the center of the first lens is received on a periphery of the second lens outside the center of the second lens and an outer edge of the fingerprint image passing through the first lens is received at the center of a surface of the second lens facing the first lens and passes along the principal axis of the second lens; and
    an image sensor on which the fingerprint image passing through the second lens is formed, wherein the image sensor is tilted and, the reflector unit is positioned between the prism and the lens unit so as to directly reflect the fingerprint image to the lens unit.

2. The optical structure of claim 1, further comprising:
    an image adjusting unit configured to adjust the fingerprint image formed on the image sensor to have the same aspect ratio or size as the contact surface.

3. The optical structure of claim 1, wherein the input surface of the prism is further configured to comprise a first input surface that adjoins the contact surface and is tilted with respect to the contact surface, and the lighting unit is further configured to comprise a first lighting unit to irradiate a beam of light to the first input surface.

4. The optical structure of claim 3, wherein the input surface of the prism is further configured to comprise a second input surface formed facing in parallel to the contact surface, and the lighting unit is further configured to comprise a second lighting unit to irradiate a beam of light to the second input surface.

5. The optical structure of claim 1, wherein the input surface of the prism is further configured to comprise a second input surface formed facing in parallel to the contact surface, and the lighting unit is further configured to comprise a second lighting unit to irradiate a beam of light to the second input surface.

6. The optical structure of claim 1, wherein the reflector unit comprises a concave mirror to reflect and focus the received fingerprint image to the lens unit.

7. An optical structure for fingerprint acquisition, comprising:
    a prism configured to comprise an input surface to which light is irradiated, a contact surface formed horizontally to be in contact with a finger that reflects the light that has been irradiated to the input surface, and an output surface through which the light that has been irradiated to the input surface and reflected from the finger in contact with the contact surface passes;
    a lighting unit configured to irradiate a beam of light to the input surface of the prism;
    a reflector unit configured to reflect a fingerprint image passing through the output surface of the prism;
    a lens unit configured to comprise two or more lenses, each being configured to receive the fingerprint image reflected from the reflector unit; and
    wherein the input surface of the prism comprises a first input surface that adjoins the contact surface and is tilted with respect to the contact surface, and a second input surface formed facing in parallel to the contact surface;
    the lighting unit is further configured to irradiate a beam of light to the first input surface and the second input surface;
    the lens unit comprises a first lens configured to receive the fingerprint image reflected from the reflector unit and a second lens configured to receive the fingerprint image from the first lens;
    the first lens and the second lens are aligned to each other in such a manner that the principal axis of the second lens is eccentric with respect to the principal axis of the first lens such that a light ray of the fingerprint image corresponding to a point of the fingerprint image that passes through the center of the first lens is received on a periphery of the second lens outside the center of the second lens and an outer edge of the fingerprint image passing through the first lens is received at the center of a surface of the second lens facing the first lens and passes along the principal axis of the second lens; and
    an image sensor on which the fingerprint image passing through the second lens is formed, wherein the image sensor is tilted.

8. An optical structure for fingerprint acquisition, comprising:
    a prism configured to comprise an input surface to which light is irradiated, a contact surface formed horizontally to be in contact with a finger that reflects the light that has been irradiated to the input surface, and an output surface through which the light that has been irradiated to the input surface and reflected from the finger in contact with the contact surface passes;
    a lighting unit configured to irradiate a beam of light to the input surface of the prism;
    a reflector unit configured to reflect a fingerprint image passing through the output surface of the prism;

a lens unit configured to comprise a first lens and a second lens, the first lens being configured to receive the fingerprint image reflected from the reflector unit and the second lens being configured to receive the fingerprint image from the first lens;

the first lens and the second lens being aligned to each other in such a manner that the principal axis of the second lens is eccentric with respect to the principal axis of the first lens such that a light ray of the fingerprint image corresponding to a point of the fingerprint image that passes through the center of the first lens is received on a periphery of the second lens outside the center of the second lens and an outer edge of the fingerprint image passing through the first lens is received at the center of a surface of the second lens facing the first lens and passes along the principal axis of the second lens; and an image sensor on which the fingerprint image passing through the second lens is formed, wherein the image sensor is tilted, wherein the reflector unit is positioned between the prism and the lens unit so as to directly reflect the fingerprint image to the lens unit.

* * * * *